(12) United States Patent
Herzog et al.

(10) Patent No.: US 11,007,574 B2
(45) Date of Patent: May 18, 2021

(54) APPARATUS FOR MANUFACTURING OF THREE-DIMENSIONAL OBJECTS

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Philipp Schumann, Itzgrund-Schottenstein (DE); Marie-Christin Ebert, Coburg (DE)

(73) Assignee: CONCEPT LASER GMBH, Lichtenfels (DE)

( * ) Notice: Subject to any disclaimer, the term of this patent is extended or adjusted under 35 U.S.C. 154(b) by 235 days.

(21) Appl. No.: 15/709,265

(22) Filed: Sep. 19, 2017

(65) Prior Publication Data

US 2018/0079004 A1 Mar. 22, 2018

(30) Foreign Application Priority Data

Sep. 19, 2016 (DE) .......................... 102016117633.8

(51) Int. Cl.
| | |
|---|---|
| *B29C 64/153* | (2017.01) |
| *B29C 64/35* | (2017.01) |
| *B33Y 30/00* | (2015.01) |
| *B33Y 40/00* | (2020.01) |
| *B33Y 50/00* | (2015.01) |
| *B22F 10/00* | (2021.01) |
| *B22F 10/10* | (2021.01) |

(52) U.S. Cl.
CPC ............ *B22F 10/00* (2021.01); *B29C 64/153* (2017.08); *B29C 64/35* (2017.08); *B33Y 30/00* (2014.12); *B33Y 40/00* (2014.12); *B33Y 50/00* (2014.12); *B22F 10/10* (2021.01)

(58) Field of Classification Search
CPC ....................................................... B29C 64/35
See application file for complete search history.

(56) References Cited

U.S. PATENT DOCUMENTS

| | | | |
|---|---|---|---|
| 5,489,338 A * | 2/1996 | Fujino ..................... | C23C 14/28 118/50.1 |
| 8,070,474 B2 | 12/2011 | Abe et al. | |
| 8,105,066 B2 * | 1/2012 | Sperry .................. | B29C 64/112 425/185 |

(Continued)

FOREIGN PATENT DOCUMENTS

| | | |
|---|---|---|
| CN | 101541511 A | 9/2009 |
| CN | 105128343 A | 12/2015 |

(Continued)

OTHER PUBLICATIONS

European Search Report Corresponding to Application No. 17174400 dated Nov. 24, 2017.

(Continued)

*Primary Examiner* — Marc C Howell
*Assistant Examiner* — Nicholas J Chidiac
(74) *Attorney, Agent, or Firm* — Dority & Manning, P.A.

(57) ABSTRACT

An apparatus (1) for manufacturing of three-dimensional objects (2), especially SLM or SLS apparatuses (selective laser melting apparatus or selective laser sintering apparatus), significantly comprising a construction room (4) arranged in a housing (3) of the apparatus (1).

20 Claims, 2 Drawing Sheets

(56) References Cited

U.S. PATENT DOCUMENTS

| | | | |
|---|---|---|---|
| 2004/0076481 A1* | 4/2004 | Jessmore | B09B 1/00 405/266 |
| 2008/0179786 A1* | 7/2008 | Sperry | B29C 64/112 264/308 |
| 2016/0067779 A1* | 3/2016 | Dautova | B33Y 10/00 419/7 |
| 2017/0136574 A1 | 5/2017 | Zenzinger et al. | |
| 2017/0341143 A1* | 11/2017 | Abe | B33Y 10/00 |
| 2019/0224918 A1* | 7/2019 | Zheng | B29C 64/112 |

FOREIGN PATENT DOCUMENTS

| | | | | |
|---|---|---|---|---|
| DE | 102006047794 A1 | | 4/2008 | |
| DE | 102008037345 A1 | | 2/2010 | |
| DE | 102013219961 A1 | | 4/2015 | |
| DE | 102014212246 B3 | | 8/2015 | |
| EP | 2537665 A1 | * | 12/2012 | ............ B33Y 10/00 |
| EP | 2537665 A1 | | 12/2012 | |
| WO | WO-2016103686 A1 | * | 6/2016 | ............ B33Y 10/00 |
| WO | WO2008146920 A1 | | 8/2018 | |

OTHER PUBLICATIONS

Machine Translated Japanese Office Action Corresponding to Application No. 20017153250 dated Aug. 28, 2018.

Combined Chinese Search Report and Office Action Corresponding to Application No. 2017106382145 dated Apr. 29, 2019.

\* cited by examiner

APPARATUS FOR MANUFACTURING OF THREE-DIMENSIONAL OBJECTS

CROSS-REFERENCE TO RELATED APPLICATIONS

This application claims priority to German Patent Application serial No. 10 2016 117 633.8 filed Sep. 19, 2016, the contents of which is incorporated herein by reference in its entirety as if set forth verbatim.

CROSS-REFERENCE TO RELATED APPLICATIONS

This application claims priority to German Patent Application serial no. 10 2016 117 633.8 filed Sep. 19, 2016, the contents of which is incorporated herein by reference in its entirety as if set forth verbatim.

The invention relates to an apparatus for manufacturing of three-dimensional objects, especially an SLM or an SLS apparatus, comprising the further features of the preamble of claim 1. In addition, the invention also relates to a related method comprising the features of claim 13.

When an apparatus for manufacturing of three-dimensional objects in connection with the preamble of claim 1 is mentioned, this addresses all apparatuses also known as "3D printers" that are formed and suited to construct three-dimensional items by a layer-by-layer application of a powdered, liquid or paste-like construction material on a base or a layer already formed, wherein the layer is selectively converted into a solidified state using radiation, especially laser radiation, such that the desired component can be constructed layer by layer from stored construction data. Especially addressed are plastic laser sintering or melting systems, metal powder laser sintering or melting systems, or stereolithography systems, in which a liquid resin-like material is applied layer by layer and is then selectively solidified according to the provided construction data.

In the addressed systems, in a housing a construction room is arranged, in which a support plate for carrying the object being formed is provided. In addition, a device for applying construction material layer by layer onto the carrying device or a layer already formed is present. An irradiation device is present above the layer for selectively irradiating the applied construction material for the solidification thereof, wherein at least one beam of the irradiation device is guided to the construction material depending on the construction data. In most cases, guidance of the at least one beam of the irradiation device is carried out depending on the construction data using a scanner device; however, also devices, in which by a plurality of radiation sources, which are fixedly or movably arranged, a selective irradiation of the construction material is carried out, fall within the subject matter of the invention. It is also possible to guide only one radiation source, e.g. a laser, specifically and selectively over the surface of the construction material, depending on stored construction data.

In order to improve ongoing construction processes and/or coating processes of the construction material, it is desirable to provide a camera device that is suited for optical detection and/or also recording of a melting or solidification process of the construction material forming in the focus of the beam of the irradiation device. However, such a camera can also serve for optically detecting and/or monitoring or recording a coating process of the construction material on the carrying device; in other words, the construction process can either be observed, monitored and recorded during the selective solidification of the construction material, to e.g. perform a quality control of the construction material, and/or the coating process can be monitored already prior to exposure, to conduct a qualitative check of a construction material coating, since a construction material layer error-freely applied is extremely important for the quality of the component coming into being.

As is known, optical front lenses of camera devices, scanners or other exposure elements are sensitive to contamination e.g. by smoke or construction material splashes or the like that can occur in a construction room of such an SLM or SLS apparatus or other 3D printing devices. For this reason, protective glasses are now being arranged between the zone of the construction process and the camera optics (e.g. DE 10 2010 052 206).

It has also been discussed to provide a radiation reflective glass between the camera optics and the zone of the construction process, since in certain materials, such as e.g. noble metals, a reflection of the laser beam can "in itself" result in an interruption of the discharge of the laser, which negatively affects the construction process (DE 10 2014 005915 A1).

Such "protective glasses" have to be kept as free from contamination as possible. It has already been discussed to guide a gas flow in the construction chamber such that smoke and vapors of a protective glass device or reflective glass device are kept as far away as possible.

The invention is based on the object of further developing an apparatus with the features of the preamble of claim 1 or a method with the features of claim 13, respectively, such that a monitoring of the coating or construction process is possible without interruption also with very long, extremely smoking construction processes. Especially, a manual cleaning of the apparatus, especially the protective glass, is supposed to be omitted. Especially, it should be prevented that cleaning elements for the protective glass temporarily or in sections penetrate the optical path, which would also result in an interruption of the construction process.

This object is solved in that the camera protective glass and/or the radiation reflective glass is formed and drivably supported such that parts of the camera protective glass and/or the radiation reflective glass are continually guided through a glass cleaning device in an ongoing construction process and camera operation, wherein during cleaning at least one portion of the camera protective glass or reflective glass is arranged in front of the camera optics.

Thus, the core of the invention is at least one glass cleaning device arranged laterally adjacent to the optical path of the camera or the solidification radiation source such that respectively one part of the protective or reflective glass can continually, oscillatory, or rotary be guided through the cleaning device. It is significant that the cleaning process does not negatively affect or even interrupt the construction process and/or the observation process. The protective or reflective glass can be horizontally arranged in front of the lens of the camera or in front of the irradiation device and can be rotary driven around a vertical axis. However, it is also in the scope of the invention to provide an inclined arrangement of the protective glass and to incline the rotational axis accordingly. However, basically, it is also possible to move a protective or reflective glass oscillatingly back and forth in front of the camera device and to provide cleaning elements on one or both sides that clean the bottom side of the back and forth moving protective or reflective glass. A cleaning element should be movable relative to the glass surface, especially bottom side of the glass, to be cleaned. The relative movement can e.g. be caused by moving the glass, but also by moving the cleaning element, for example in the form of a brush or lip, back and forth, or by driving it in a rotatory or vibratory manner. An ultrasonic cleaning element or bath is also in the scope of the invention. The glass cleaning device should be encapsulated from the construction room; it has to be ensured that no dirt removed from the bottom side of the glass falls onto the construction surface. For this purpose, a collecting container is provided that can take smoke residues and the like.

The protective glass can also have a dirt-repellent coating supporting the cleaning process.

In order to restrict protective or reflective glass movements to a minimum, in the context of the invention it is advantageous when the contamination level is detected continuously or at time intervals, and a cleaning is initiated only when a contamination of the bottom side of the glass is given that is affecting the construction or monitoring process. This can be performed by an optical sensor. However, it is also possible that the optical sensor is formed by the camera itself, which e.g. evaluates a reference pattern below the protective or reflective glass regarding clarity and contrast. The speed of the motor drive of the pane to be cleaned or the cleaning element can be controlled depending on the contamination level of the glass. The contamination level can be determined in different ways, e.g. also by a surface wave sensor responsive to the adherent particles that is used for particle and/or liquid adhesions. It is also purposeful, when especially with long construction processes the cleaning container can be emptied during the construction process, in order to keep it as compact as possible.

The invention is explained in more detail by means of exemplary embodiments. In which.

Figure 1:
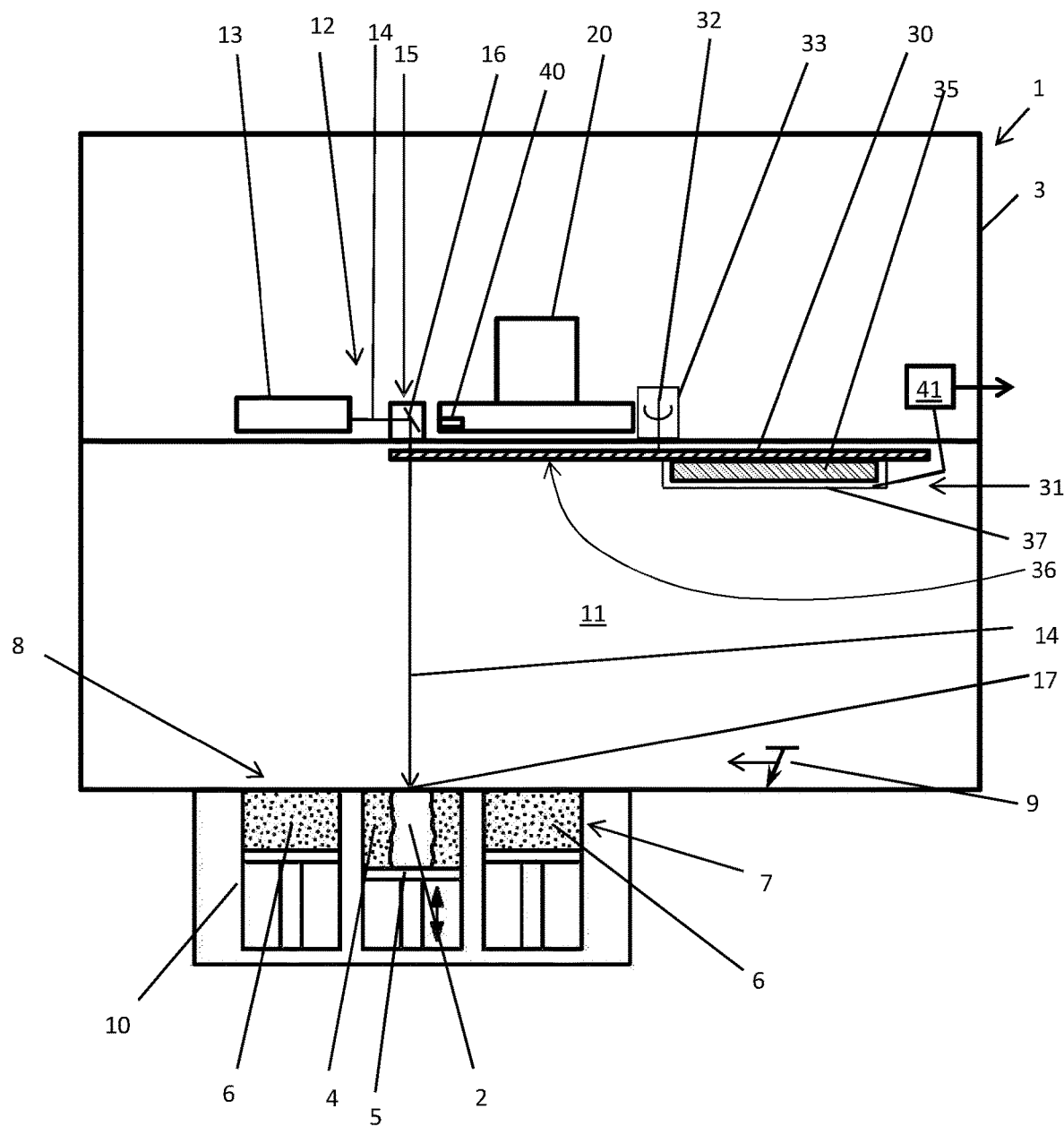
FIG. 1 shows an apparatus according to the invention with a rotating protective pane.

At first, reference is made to FIG. 1 of the drawings.

In FIG. 1 of the drawings an apparatus 1 for manufacturing three-dimensional objects 2 is shown only schematically, in which in a housing 3 of the apparatus 1 a construction room 4 is arranged, in which a support plate 5 for carrying the object 2 coming into being or the construction material 6 is provided. The construction material is kept at hand in a metering chamber 7 that is inserted in a process chamber bottom 8 like the construction room 4. A device 9 for applying the construction material 6 is for example formed as doctor blade that can be moved above the metering chamber 7 and the construction chamber 4, which in the metering chamber 7 receives construction material, applies a thin layer in the section of the construction chamber 4, and drops excessive construction material 6 in an overflow tank 10.

Above or in the upper section of the process chamber 11 an irradiation device 12 is provided that serves selective irradiating of the applied construction material 6 for the solidification thereof, wherein in the exemplary embodiment the beam 14 of a laser 13 is guided through a scanner 15, the mirrors 16 thereof are controlled by construction data such that the focus 17 of the laser beam 14 hitting the construction material can melt and thereby solidify the construction material.

Furthermore, in the upper section of the apparatus, i.e. above the process chamber or in a process chamber ceiling a camera device 20 for optically detecting and/or also recording a melting or solidification process of the construction material 6 forming within the focus 17 of the beam of the irradiation device 12 and/or for optically detecting and/or monitoring and/or recording a coating process of the construction material 6 is provided, wherein the optics 21 of the camera device 20 is separated by a camera protective glass 30 or the optics of the scanner is separated by a radiation reflective glass from the ongoing construction process.

It should be noted that the radiation reflective glass can also be used as camera protective glass 30 and the camera protective glass with respective design can also be used as radiation reflective glass, because of which in the exemplary embodiment only one protective glass is arranged or illustrated in front of the two optical elements camera and scanner.

However, it is also in the context of the invention to provide separate protective glasses for the camera on one hand and the scanner on the other hand, which can be cleaned in the respective manner mentioned in the following.

The protective glass 30 is formed and drivably supported such that in the ongoing construction process and/or camera observation process parts of the protective glass 30 are carried through a glass cleaning device 31, wherein during the cleaning at least one other portion of the protective glass remains in front of the camera optics and/or the irradiation optics.

In the exemplary embodiment shown in FIG. 1, the protective glass 30 is arranged horizontally and rotary driven around a vertical axis 32 by an electric motor 33.

The glass cleaning device 35 is arranged laterally adjacent to the optical axis of the camera device 20 and/or the irradiation optics, namely scanner 15.

The glass cleaning device 31 comprises at least one cleaning element 35 formed as a brush that contacts the bottom side 36 of the protective glass 30 and detaches adherent smoke particles and the like into a collecting container 37.

The glass cleaning device 31 is altogether encapsulated from the process chamber 11, i.e. it is ensured that particles present in the glass cleaning device 31 or in the collecting container 37 are not able to enter the construction surface.

The invention further comprises a sensor 40 arranged in or on the glass cleaning device, which can detect the contamination of the protective glass 20. The sensor 40 is preferably an optical sensor that determines by a transmission of the protective glass if and optionally how particles adhere to the bottom side of the protective glass. However, the sensor can also be formed by the camera 20.

The speed of the motor drive 33 of the pane or the cleaning element 35 can be controlled depending on the result of the contamination level of the glass 20 detected by the sensor 40.

The collecting container 37 can be sucked off and thus emptied during the construction process by a suction device 41.

Figure 2:
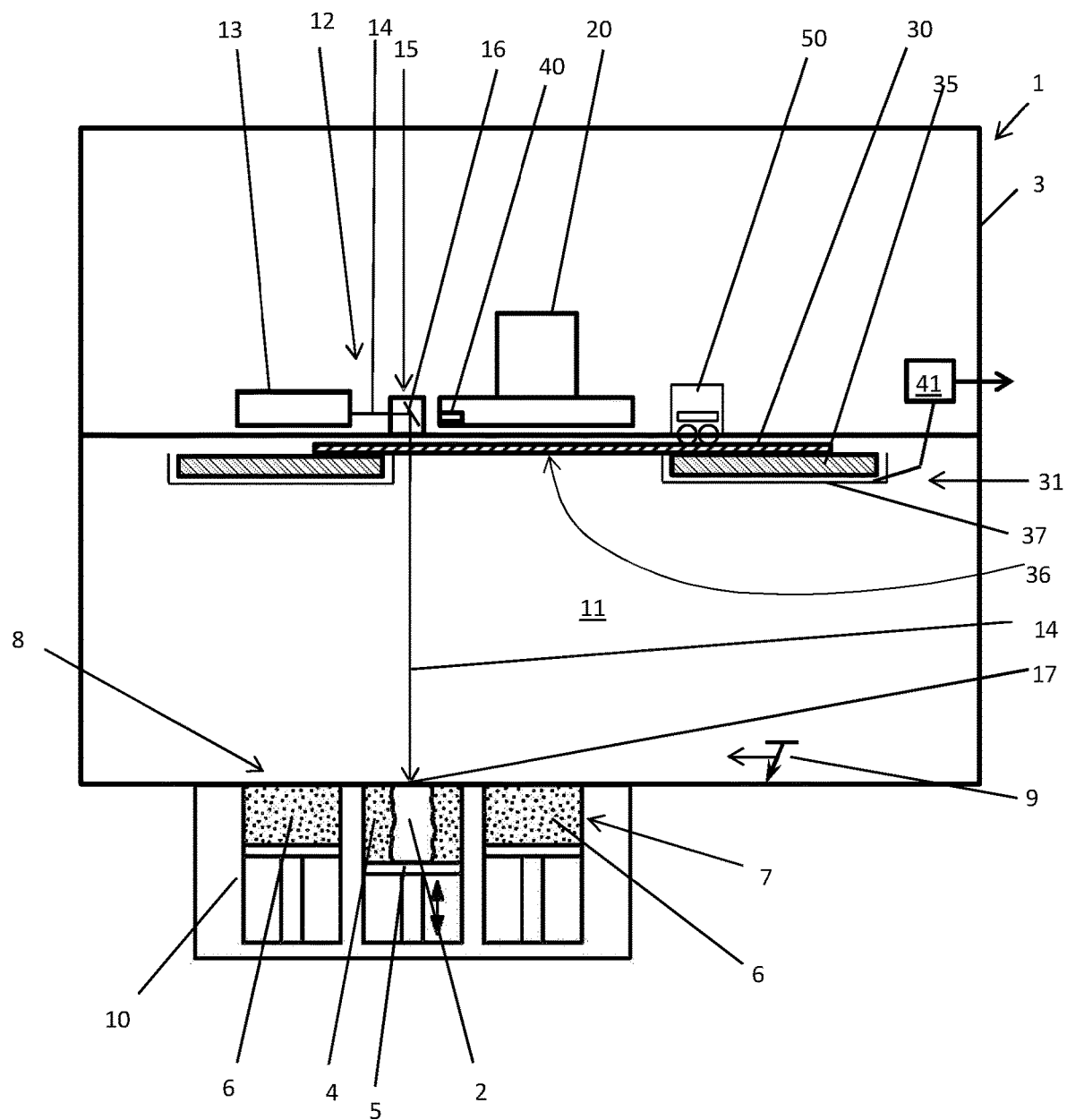
FIG. 2 shows an apparatus similarly built, in which the protective pane is arranged such that it can be displaced back and forth, and in which two cleaning devices are provided.

In FIG. 2 an apparatus is shown that is in extensive portions identical to FIG. 1, however, the electric motor 33 is not formed to rotary drive an axis 32 and the protective glass 30, but the protective glass 30 is supported such that it can be displaced to the left and to the right via guiding elements not shown, the electric motor 33 has roller sets 50, by which the protective glass 30 is displaced to the left and to the right by frictional contact.

To the left and the right of the camera and/or the optical elements of the irradiation device 12 two glass cleaning devices 31a and 31b are arranged, thus the protective glass 30 can be moved to the left and to the right such that all sections of the protective glass 30 can be cleaned at time intervals, and a portion of the protective glass 30 always remains in front of the camera optics or the irradiation optics.

LIST OF REFERENCE NUMBERS

1 Apparatus
2 Object
3 Housing
4 Construction room
5 Support plate
6 Construction material
7 Metering chamber
8 Process chamber bottom
9 Apparatus
10 Overflow tank
11 Process chamber
12 Irradiation device
13 Laser
14 Beam
15 Scanner
16 Mirror
17 Focus
20 Camera device
21 Optics
30 Camera protective glass
31 Glass cleaning device
32 Vertical axis
33 Electric motor
35 Cleaning element
36 Bottom side
37 Collecting container
40 Sensor
41 Suction device
50 Roller sets

The invention claimed is:

1. An apparatus for manufacturing three-dimensional objects, the apparatus comprising:
a housing defining a process chamber;
a carrying device defining a construction room, the carrying device coupled to the housing and configured to support sequentially applied layers of construction material, and the construction room communicating with the process chamber;
a coating device configured to apply the sequentially applied layers of construction material;
an irradiation device configured to selectively irradiate selective portions of the sequentially applied layers of construction material, the selective portions melting and solidifying as a result of the irradiation;
a camera device configured to perform an observation process, the observation process comprising optically detecting, monitoring, and/or recording at least a portion of a construction process, the detected, monitored, and/or recorded portion of the construction process comprising (a) melting and/or solidifying of the construction material as a result of the irradiation from the irradiation device, and/or (b) applying of the construction material with the coating device;
a protective glass separating the camera device and/or the irradiation device from the process chamber;
a sensor configured to detect a contamination level of the protective glass;
a cleaning device comprising a cleaning element and a collecting container; and
a motor configured to move the protective glass relative to the cleaning element;
wherein the cleaning element is configured to remove residues from at least a portion of the protective glass, and the collecting container is disposed between the protective glass and the sequentially applied layers of construction material and is configured to collect the residues removed by the cleaning element.

2. The apparatus of claim 1, wherein the motor is configured to drivingly rotate the protective glass around a vertical axis.

3. The apparatus of claim 1, wherein the irradiation device has a first optical axis and the camera device has a second optical axis, and wherein the cleaning device is arranged laterally adjacent to the first optical axis and/or the second optical axis.

4. The apparatus of claim 1, wherein the cleaning element is configured to contact a bottom side of a portion of the protective glass.

5. The apparatus of claim 1, wherein the cleaning element comprises an ultrasonic bath element.

6. The apparatus of claim 1, wherein the cleaning device is encapsulated from the process chamber.

7. The apparatus of claim 1, wherein the sensor defines at least a portion of the camera.

8. The apparatus of claim 1, wherein the sensor comprises a surface wave sensor.

9. The apparatus of claim 1, comprising:
a controller, the controller configured to control the speed of the motor based at least in part on the contamination level of the protective glass having been detected by the sensor.

10. The apparatus of claim 1, comprising:
a controller;
wherein the cleaning element comprises a brush and/or a wiping element, the brush and/or the wiping element being mechanically movable in relation to the protective glass; and
wherein the controller is configured to control the speed of the mechanically movable brush and/or wiping element based at least in part on the contamination level of the protective glass having been detected by the sensor.

11. The apparatus of claim 1, wherein the collecting container is configured to be emptied during the construction process.

12. The apparatus of claim 1, wherein the apparatus is configured to perform a selective laser melting process and/or a selective laser sintering process.

13. The apparatus of claim 1, wherein the cleaning device and/or the motor are configured to movably contact at least a portion of the protective glass with the cleaning element.

14. The apparatus of claim 1, wherein the motor is configured to move at least a portion of the protective glass relative to the cleaning element the during the construction process and/or observation process while at least another portion of the protective glass is arranged between the camera and the process chamber and/or between the irradiation device and the process chamber.

15. The apparatus of claim 1, wherein the cleaning element comprises a brush and/or a wiping element.

16. The apparatus of claim 15, wherein the brush and/or the wiping element is mechanically movable in relation to the protective glass.

17. The apparatus of claim 1, wherein the motor is configured to oscillate the protective glass relative to the cleaning element, and/or wherein the motor is configured to move the protective glass laterally relative to the cleaning element.

18. The apparatus of claim 17, wherein the motor comprises one or more rollers configured to oscillate or move laterally the protective glass relative to the cleaning element.

19. An apparatus for manufacturing three-dimensional objects, the apparatus comprising:
a housing defining a process chamber;
a carrying device defining a construction room, the carrying device coupled to the housing and configured to support sequentially applied layers of construction material, and the construction room communicating with the process chamber;
a coating device configured to apply the sequentially applied layers of construction material;
an irradiation device configured to selectively irradiate selective portions of the sequentially applied layers of construction material, the selective portions melting and solidifying as a result of the irradiation;
a camera device configured to perform an observation process, the observation process comprising optically detecting, monitoring, and/or recording at least a portion of a construction process, the detected, monitored, and/or recorded portion of the construction process comprising (a) melting and/or solidifying of the construction material as a result of the irradiation from the irradiation device, and/or (b) applying of the construction material with the coating device;
a protective glass separating the camera device and/or the irradiation device from the process chamber;
a cleaning device comprising a cleaning element and a collecting container; and
a motor configured to move the protective glass relative to the cleaning element, wherein the motor is configured to drivingly rotate the protective glass around a vertical axis;
wherein the cleaning element is configured to remove residues from at least a portion of the protective glass, and the collecting container is disposed between the protective glass and the sequentially applied layers of construction material and is configured to collect the residues removed by the cleaning element.

20. A method of cleaning a protective glass in an apparatus for manufacturing three-dimensional objects, the method comprising: performing a construction process comprising: applying with a coating device, respective ones of a plurality of layers of construction material, the layers of construction material supported by a carrying device defining a construction room; and irradiating with an irradiation device, the respective ones of the plurality of layers of construction material, thereby melting and solidifying selective portions of the respective ones of the plurality of layers of construction material, the irradiating occurring in a process chamber defined by a housing, the carrying device being coupled to the housing, and the construction room communicating with the process chamber; performing an observation process with a camera device, the observation process comprising optically detecting, monitoring, and/or recording at least a portion of the construction process, the detected, monitored, and/or recorded portion of the construction process comprising (a) melting and/or solidifying of the construction material as a result of the irradiation from the irradiation device, and/or (b) applying of the construction material with the coating device; detecting a contamination level of the protective glass with a sensor; and performing a cleaning process using a cleaning device comprising a cleaning element and a collecting container disposed between the protective glass and the plurality of layers of construction material, the cleaning process comprising: removing residues from at least a portion of the protective glass separating the camera device and/or the irradiation device from the process chamber at least in part by moving with a motor the protective glass relative to the cleaning element; and collecting with the collecting container, the residues removed by the cleaning element.

* * * * *